United States Patent [19]
Jacobs

[11] Patent Number: 5,860,653
[45] Date of Patent: Jan. 19, 1999

[54] METHOD AND APPARATUS FOR PLAYING A WORD GAME

[76] Inventor: Robert Jacobs, 10503 Whipple St., Toluca Lake, Calif. 91602

[21] Appl. No.: 441,493

[22] Filed: May 15, 1995

[51] Int. Cl.[6] .................................................... A63F 9/22
[52] U.S. Cl. .......................... 273/272; 434/172; 273/292
[58] Field of Search ............................... 273/153 R, 237, 273/272, 299, 302; 434/159, 167, 168, 169, 170, 171, 172; 345/157

[56] References Cited

U.S. PATENT DOCUMENTS 5,041,992  8/1991  Cunningham et al. .................. 345/157

*Primary Examiner*—William M. Pierce

*Attorney, Agent, or Firm*—Robert Jacobs

[57] ABSTRACT

Apparatus and method for playing an anagram-type game in a game show or computer game format. One or more anagrams, each comprised of scrambled letters, are displayed on a gameboard. At least one object of the game is to guess the unscrambled solution to each anagram. When correctly guessed, the letters are moved from their scrambled configuration to their unscrambled configuration. An ultimate solution to the puzzle is preferably revealed by some of the letters of the collective unscrambled anagrams which are moved into a predetermined alignment. Several means are included for making it easier to view, study and follow the progress of the game such as moving each letter along a path, leaving outlines of the letters in their initial positions, and indicating which anagram is to be guessed by a player.

19 Claims, 4 Drawing Sheets

METHOD AND APPARATUS FOR PLAYING A WORD GAME

FIELD OF INVENTION

This invention relates to word games. More specifically, this invention relates to a method and apparatus for playing an anagram-type word game in a computer game and/or t.v. game show format.

BACKGROUND OF THE INVENTION

Anagram-type games usually include the presentation of at least one word, whose constituent letters are displayed out of order. One object of such a game is normally for a player to unscramble the displayed letters to form a word. Several well known anagram-type games have been published in newspapers as featured word games (such as SCRABBLE-GRAM®, JUMBLE®, and REVELATION®) or as board games (such as SCRABBLE® or BOGGLE®). However, anagram-type games have thus far been unsuccessful in either a computer game or t.v. game show format. There are many reasons for this lack of success, but it mostly stems from the failure of the producers to fully understand and appreciate the nature of such word games. Anagram-type word games require a great deal of study and concentration not only for the players to be able to solve the anagrams but, even more importantly for the success of a t.v. game show or computer game, for the enjoyment of onlookers and home viewers. It is therefor absolutely necessary for the success of such a format that every opportunity be taken to provide ways to allow all people watching the game to easily study the puzzle, to easily follow the progress of the game and to easily understand how and where the letters are moved from their scrambled positions to their unscrambled positions.

A prior art TV game show named CAESAR'S CHALLENGE® provides an excellent example of the failure to appreciate the need for onlookers to study and concentrate on the puzzle and follow the progress of its solution. On CAESAR'S CHALLENGE®, the contestants and the viewing audience were presented with an anagram puzzle in which the location of the letters were repeatedly shifted with no clear and easy means of following the movement of the letters. It was frustrating, particularly for members of the viewing audience who had not yet solved the anagram, to readjust one's concentration every time the location of the letters shifted; and it was further especially frustrating to see the solution to the anagram presented without being able to follow the movement of the letters and allowing the viewer to see clearly and easily how the anagram was solved. The active participation of the average viewer is lost when the viewer is not given an opportunity to solve the puzzle, or at least be provided with an easy way of seeing how the puzzle is solved. And when active participation is lost, so is the enjoyment.

Similarly, a previous t.v. game show version of REVELATION® also failed in several respects to provide ways for onlookers and the viewing audience to easily follow the progress of the game and the unscrambling of the letters of the several anagrams presented in a REVELATION® puzzle.

Another reason that previous anagram-type games have failed in the t.v. game show or computer game format is that such games have only displayed one anagram at a time, and therefor onlookers get frustrated if they are unable to solve that one anagram, or they get impatient and lose interest if they solve the one anagram quickly and have to wait for the contestants to solve it before having another anagram displayed.

Another reason that previous anagram-type games have failed in the t.v. game show or computer game format is that the unique ability to solve anagrams requires a certain aptitude which many viewers do not have. If there is nothing else in the game except an anagram, then viewers with no aptitude for solving anagrams will not watch.

There is a need to provide ways for onlookers and the viewing audience of anagram-type game shows and computer games to more easily follow the progress of the game and understand how and to where the letters of the anagram (s) are unscrambled.

There is a need for an anagram-type game show and/or computer game which displays more than on anagram at a time.

There is a need for an anagram-type game show and/or computer game which includes other puzzle-solving skills in addition to solving anagrams, and preferrably the other puzzle-solving skills will be part of the puzzle displayed.

SUMMARY OF THE INVENTION

This invention involves a method and apparatus for playing a game show or computer/video game employing the use of anagram-type puzzles or other like games which require concentration and easy visualization and understanding of the movement and relative movement of the characters employed in the game.

An anagram is defined herein as a set of characters or symbols, usually but not necessarily alphanumeric, which can be put into a meaningful sequence, pattern or order which spells or defines a predetermined word, slang, phrase, name, abbreviation, equation, phrase or other solution.

A display board or game board is used to display the constituent elements of the game or puzzle. The game show or computer/video format of this invention requires that the characters which define each anagram are moveable. One preferred display board is a computer or video monitor in which characters, or images of characters, are displayed and the movements of the displayed characters, as described hereinafter, can be accomplished by well known computer graphics, animation, or other software programs. Alternatively, the moveable characters of the puzzle can be moved with respect to the gameboard, as described hereinbelow, by mechanical or manual means.

One or more anagrams are displayed on the game board or monitor. Any number of anagrams can be displayed at one time. As will be seen with at least one of the claimed combinations, a particular arrangement which includes several anagrams is one preferred embodiment. It will be evident that both the number of characters per anagram and/or the number of anagrams displayed may vary from puzzle to puzzle. It will also be evident that the display of only one anagram per puzzle is also anticipated by this invention.

Each set of characters defining a single anagram is initially displayed on the gameboard in a predetermined scrambled or unsolved arrangement in which each character is assigned a respective initial position. In their initial positions, the characters are collectively arranged in a predetermined pattern which does not define the solution of that anagram.

A designated solution area is displayed on the gameboard for each of the displayed anagrams. A predetermined final position within each solution area is provided for each character defining the anagram corresponding to that respective solution area. When the collective characters defining one anagram are moved into their respective final positions in their related solution area, the collective characters spell or define the predetermined solution to that anagram.

It is preferred, but not necessary, that each solution area is separate and distinct from the related initial positions of the characters of each anagram, and that each of the anagrams is displayed adjacent its corresponding solution area. It is also preferred, but not necessary, that each solution area is displayed to the left of its corresponding solution area. Other arrangements should be apparent.

The final positions are visually displayed on the gameboard. It should be readily apparent that the designated final positions into which the letters are to be unscrambled could be almost any shape. It is preferred, but not at all necessary, that each final position be designated by a square or substantially square object. It is also preferred, but not necessary, that the visually displayed final positions be horizontally aligned within each solution area. It is further preferred, but not necessary, that the solution areas be vertically aligned relative each other, for reasons discussed below. But other arrangements and alignments are possible to accomplish the purposes of this invention as will become evident.

Means are provided for moving each of the characters from its respective initial scrambled position to its predetermined final position. The characters could be moved manually by a host or hostess standing by the gameboard. It should be obvious, however that such manual movement would take an amount of time which might not be acceptable for the fast pace required of a successful game show, especially when several characters are required to be moved at a single time, as will be explained hereinafter. The characters could be moved mechanically. This, of course, would require design engineering and expense that might be cost-prohibitive. Or the image of the characters could be displayed visually on a monitor, and the movement of those images accomplished by well known animation programming whereby the character or characters move in response to selection by a player. If these means are employed, a computer generated host or hostess could be animated to make it appear that the host or hostess manually moves the characters, and such appearance of manual movement could occur at a predetermined speed acceptable for the fast pace required of a successful game show, even when several characters are required to be moved at a single time. Additionally, the computer generated host/hostess could be a video clip of a real human, animated clip-art, an animated cartoon character or any combination of the above which could add considerable entertainment value to the overall look and feel of the game show or computer game format.

One or more of several different means are preferably provided for easy visualization of the progress of the puzzle from the time the puzzle is originally presented until the time the puzzle is completely solved. Such means include movement of characters along a path. Each character has its own predetermined path defined by a set of points from the character's initial position to its final position. Each character is preferably moved along its predetermined path by the character moving means when such character or set of characters is selected by a player, as when a solution to the anagram is correctly guessed. Letters don't just disappear from their initial position and reappear in their final position. Viewers are able to follow the progress of the letters because they move along a path. The shape of the path is not important. It is important that the path along which the character is moved contain at least one point between said initial position and said final position. In a previous version of REVELATION®, and in at least one other prior art anagram-type game show, when a player correctly guessed the solution to an anagram, the letters that were still in their initial scrambled position simply disappeared from their initial position and reappeared in their final positions without moving along a path. Without movement of the letters along a path, the focus of the viewer's eye was required to be moved constantly back and forth to remember where all of the letters came from and ascertain where they went to. Because this was relatively difficult, it detracted from the enjoyment of the game. By moving the letters along a path, the viewer is allowed to keep his focus on only one area of the puzzle at a time, and is able to concentrate on the real object of the game, solving the anagram. This makes it easier for the viewer and players to play and follow the game and therefor necessarily adds considerable enjoyment. The previous version of this game provided a video display of the gameboard which was edited to appear to have the character (s) move instantaneously from its initial position to its final position without moving the character along a path. As discussed, such instantaneous movement is not the most appropriate way to move characters in a puzzle game which requires concentration of players and onlookers, and which enjoyment and understanding is aided by allowing players and onlookers to follow the progressive unscrambling of the character sets.

It is further preferrable that portions of the paths of all characters in a given anagram be substantially identical. This assists in making it is easy for the viewer to follow the unscrambling of the anagram. It should be evident that if the letters are moved along a similar path, the viewers eye will not have to shift and refocus as the letters are moved in immediate succession from their initial positions to their final positions.

It is further preferrable that the movement of characters be accomplished rapidly, as required by the fast pace associated with successful game shows. The fast pace is necessary due to the pathetically short attention span of the average t.v. game show viewer. The term "rapidly" is defined herein as the speed at which an average person would quickly and deliberately move one character from its initial position to its final position. Therefor, in the case of a gameboard with movable letters (not a mechanical display or a computer generated display) such "rapid" movement can be accomplished manually if only one character is moved. However, if more than one character is required to be moved at the same time, as in the case of a player correctly guessing the solution to an anagram as discussed below, one person would be unable to reliably move a plurality of letters "rapidly" enough to satisfy the fast pace required of successful game shows. Such rapid movement of a plurality of letters could only be accomplished using a mechanical display or a computer generated display with the image of the characters moving at a predetermined "rapid" pace.

In a mechanical display or a computer generated display, the characters, or images thereof, are preferably programmed to move in response to selection of those characters, as when a player correctly guesses a solution to an anagram.

When each character of an anagram is moved from its initial position to its final position, an outline of that character is preferably left with the remaining scrambled characters of that anagram that are still in their initial positions. The outline could be any image of the character which is similar to the original character or identifiable as related to the original character. The outline would preferably be distinct in any of either shading, color or size from the original character that was moved. This outline assists the viewer in studying and concentrating on the unsolved anagram without having to move the focus of his eye from the area of the puzzle containing the scrambled characters to the solution area of the puzzle. In a previous anagram-type game show, specifically a previous videotaped game show version of REVELATION®, no such outline was provided for any of the characters. Without this outline, the focus of the viewer's eye was required to shift constantly back and forth to remember and evaluate all of the characters contained in the anagram. Because this was relatively difficult, it detracted from the enjoyment of the game. With visual aids such as an outline for all of the characters, the viewer is allowed to keep his focus on only one area of the puzzle at a time, and is able to concentrate on solving the anagram. This makes it easier for the viewer and players to play and follow the game and therefor necessarily adds considerable enjoyment.

Indicator means are preferably included for directing the attention of players and other viewers to a selected one of the unsolved anagrams where a player is to make a guess at solving that anagram. This allows everyone to focus their attention on the area of the gameboard where movement of characters might take place in the then immediate future. Such indicator means could take almost any form which directs viewers' attention to the desired area of the game board. One such preferred means might be the hand or hands of a real or computer generated host/hostess. Other such means might include lights, arrows, highlighting, or any combination thereof.

In a preferred gameboard, a particular anagram-type puzzle known as REVELATION® is displayed, which includes a plurality of anagrams displayed adjacent their respective solution areas. One designated final position in each solution area is preferably visually distinct from all other final positions relating to that anagram. The characters to be moved into the visually distinct or highlighted final positions define an ultimate solution. It is further preferred that all visually distinct final positions are aligned and that such alignment be vertical. Also, it should be apparent that the vertically aligned final positions in which the ultimate solution is to appear can be highlighted in any manner which distinguishes those final positions from the rest of the final positions, without departing from the scope and spirit of this invention. At the end of the game after the players have guessed all of the anagram clues and the final solution to the sample puzzle, the letters which spell the final solution are revealed in highlighted vertically aligned squares.

A typical REVELATION® puzzle includes one or more sets of scrambled characters or anagrams, preferably on the left side of the puzzle each relating to a corresponding set of horizontally aligned final positions preferably adjacent and on the right side of the puzzle. The preliminary object of REVELATION® is to unscramble each anagram into the adjacent corresponding set of final positions to form clues. The ultimate object is to determine how each unscrambled clue is related to each other or otherwise has something in common with each other. When all of the clues are unscrambled and the letters are properly placed in the appropriate final positions, the letters contained in the set of highlighted vertically aligned boxes reveal the solution as to how the clues are all related. The final positions which are to contain the clues are preferably horizontally aligned and the highlighted final positions which are to contain the solution are vertically aligned. It should be evident that other alignments are possible within the scope and spirit of this invention. The computer/video version of the game can be played in a solitaire mode (one player) or a multi-player mode. Of course, in a multi-player mode, one or more of the players could be the computer. Similarly, the game show version can be played in a multi-player mode during preliminary rounds or in a one-player mode during a bonus round.

A preferred method of playing the game includes the steps of displaying one or more anagrams on a gameboard, and displaying a solution area for each anagram adjacent each corresponding anagram. The solution area for each anagram including a plurality of visually designated final positions which are preferably aligned in a first direction, each final position corresponding to one of the characters defining that anagram. A random number or dollar value within a predetermined range is displayed for less than a second in a random one of the final positions, which are preferably designated as squares. A second random number or dollar value is displayed immediately thereafter for less than a second in another random one of the final positions. Further random numbers continue to be displayed in the same random final positions in the same manner. These numbers are generated and displayed by well known means either electronically or by computer. It is preferred that these numbers not appear in highlighted final positions. Each player has a plunger or other type of signalling device which is connected to the means for generating and displaying the numbers. A player's turn begins when he or she strikes the plunger stopping the further generation of numbers and displaying the last random number generated. Immediately after the player hits his plunger and a number appears in a random final position, everyone's attention is directed to the anagram which is adjacent to and corresponding to that set of random final positions. The appearance of the random number in the random final position preferably accomplishes two things. First, it is a notification that the player is now playing for dollars or points corresponding to that number. Second, the player is given a hint in the way of a free letter which is to be moved into the random final position. The letter to be correctly placed in that final position is moved, preferably along a path, from its initial position to its final unscrambled position. If movement of letters on the gameboard is controlled by a computer, the computer can be programmed in a variety of well known ways to provide for the movement of letter. Alternatively, the letter can be moved mechanically or manually by a person. After the letter reaches its destination, the player is given a predetermined amount of time to make a guess at solving the anagram. If the player correctly guesses the unscrambled word, the letters still in their initial positions will be moved in immediate succession from their respective initial positions to their respective final unscrambled along their respective paths. Letters don't just disappear from their initial position and reappear in their final position. Once again, viewers are able to follow the progress of the letters because they move along a path. Further, it is preferrable that the movement of all the letters be accomplished rapidly, as that term is defined above.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

DETAILED DESCRIPTION OF THE PREFERRED EMBODIMENT OF THE INVENTION

In the following detailed description of the invention, various preferred embodiments are described in order to provide a full and complete understanding of the invention and its preferred embodiments. It will be recognized that although specific terms are employed, these are employed in the descriptive and not in the generic sense, and it will be understood that the invention is susceptible to numerous and various alternatives, modifications, and equivalents as will be apparent to those skilled in the relevant art.

The preferred embodiment shown in the accompanying figures, and detailed hereinafter, describes a method and apparatus used to play the game show or computer/video version of a specific anagram-type puzzle known as, and published under, the trademark REVELATION®. It will be evident that the same method and apparatus which allows REVELATION® to be played as a TV game show or computer/video game can also be used with other anagram type puzzles or other like games which require concentration and easy visualization and understanding of the movement and relative movement of the characters employed in the game.

Game and object of game

Figure 1:
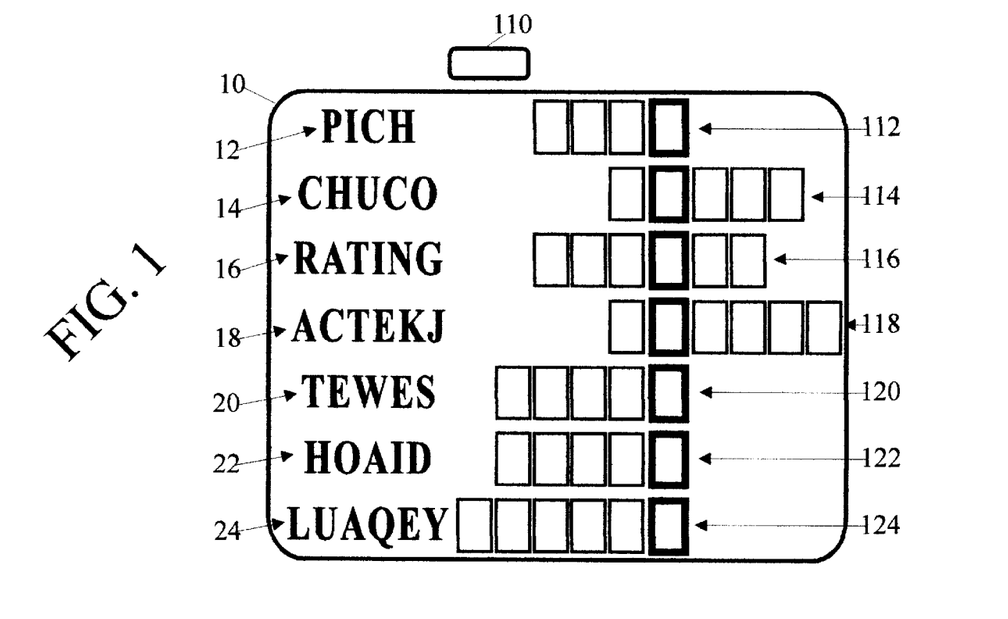
FIG. 1 is front view of a gameboard displaying a sample puzzle at a first point in time when the game is initially displayed.
Figure 2:
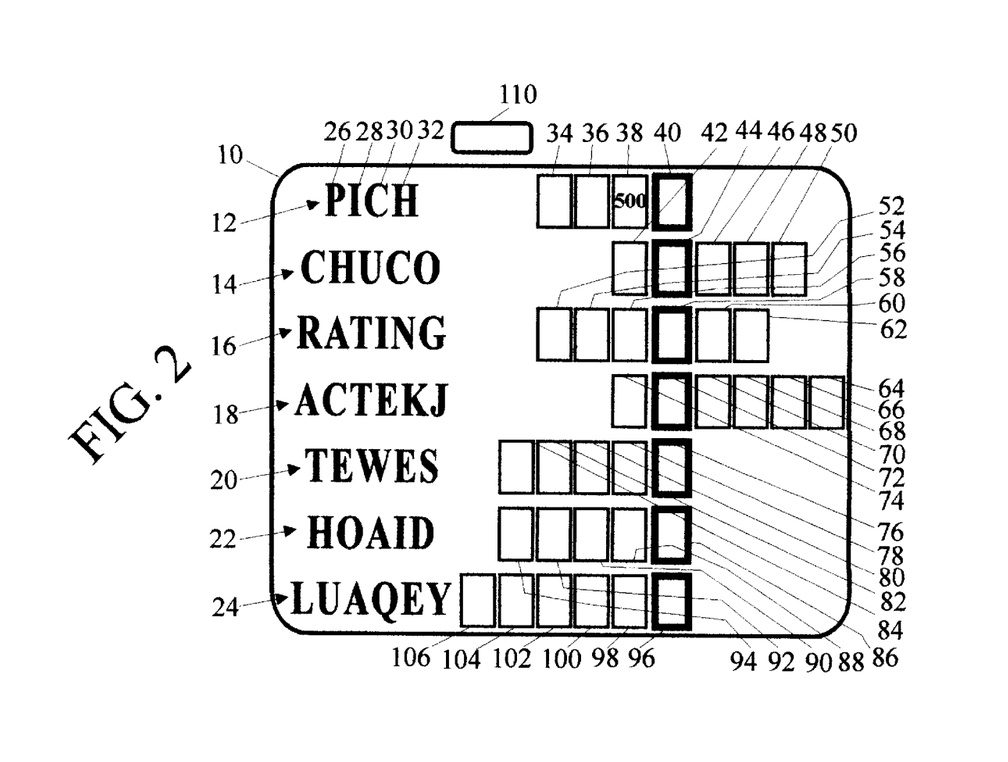
FIG. 2 is front view of a gameboard displaying the same puzzle depicted in FIG. 1 at a second point in time which is later than the first point in time depicted in FIG. 1.

As shown in FIG. 1, a typical REVELATION® puzzle includes one or more sets of scrambled characters or anagrams 12, 14, 16, 18, 20, 22, 24 on the left side of the puzzle each adjacent a corresponding set of horizontally aligned squares 112, 114, 116, 118, 120, 122, 124 on the right side of the puzzle. The number of squares in each of sets 112, 114, 116, 118, 120, 122, 124 corresponding to the number of letters in each adjacent anagram 12, 14, 16, 18, 20, 22, 24. For instance, as shown in FIG. 2, the top anagram 12 contains four letters P 26, I 28, C 30 and H 32, which corresponds in number to the four adjacent horizontally aligned squares 34, 36, 38, 40.

Figure 15:
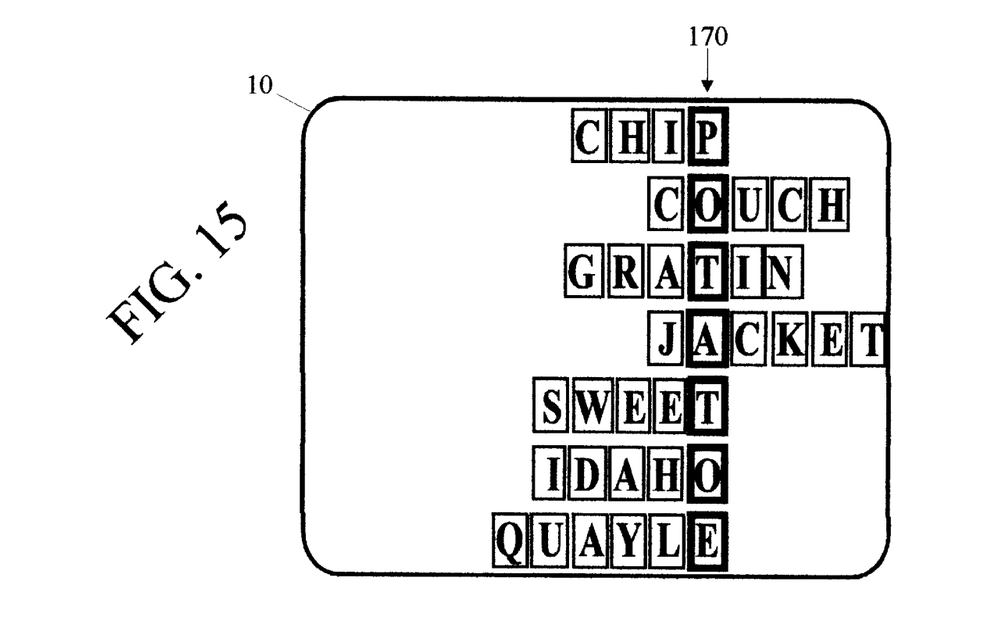
FIG. 15 is front view of a gameboard displaying the same puzzle depicted in FIG. 1 at a final point in time which is later than the point in time depicted in FIG. 14.

The preliminary object of REVELATION® is to unscramble the letters of each anagram 12, 14, 16, 18, 20, 22, 24 into the adjacent corresponding set of squares 112, 114, 116, 118, 120, 122, 124 to form clues. The ultimate object is to determine how each unscrambled clue is related to each other or otherwise has something in common with each other. When all of the clues are unscrambled and the letters are properly placed in the appropriate squares, as shown in FIG. 15, the letters contained in the set of highlighted vertically aligned boxes 40, 44, 58, 72, 76, 86, 96 reveals the solution as to how the clues are all related. In the solution revealed in FIG. 15 to the sample puzzle shown, it is readily seen that each of the clues CHIP, COUCH, GRATIN, JACKET, SWEET, IDAHO, and QUAYLE are all related in some way to the solution POTATOE 170 whose constituent letters have been moved into vertically aligned boxes 40, 44, 58, 72, 76, 86, 96.

In the sample puzzle shown, each clue is either a word or name and the solution is a word, but it should be apparent that any of the clues and/or the solution could be virtually any set of characters or symbols which has meaning, including but not limited to words, slang, phrases, names, abbreviations, equations, and the like. Also, in the sample puzzle shown, the squares which are to contain the clues are horizontally aligned and the highlighted squares which are to contain the solution are vertically aligned. It should be evident that other alignments are possible within the scope and spirit of this invention. Also, it should be readily apparent that the designated spaces (34 through 106) into which the letters are to be unscrambled do not have to be squares as shown in the sample puzzle in the figures, but instead could be almost any shape. Also, it should be apparent that the vertically aligned squares 40, 44, 58, 72, 76, 86, 96 in which the solution is to appear can be highlighted in any manner which distinguishes those squares from the rest of the squares, without departing from the scope and spirit of this invention.

Players

The computer/video version of the game can be played in a solitaire mode (one player) or a multi-player mode. Of course, in a multi-player mode, one or more of the players could be the computer. Similarly, the game show version can be played in a multi-player mode during preliminary rounds or in a one-player mode during a bonus round. The preferred embodiment discloses a multi-player mode which is equally functional for both the computer/video version and the game show version of the game.

Host

As in most game shows, it is anticipated that a host will explain the rules, direct and prompt the players actions, and otherwise assist in moving the game along and keeping it interesting. In the computer/video version, an animated host, menu, or dialog box can serve the same function.

Hostess

Preferably, a Hostess is adjacent the game board. She will assist in directing everyone's attention to the appropriate area of the gameboard where a clue is being guessed or where characters are to be moved. In the game show version, the Hostess can be a live person. In either version, the Hostess can be mechanical or computer generated.

Puzzle Board Apparatus

The players are first presented with a gameboard 10, as shown in FIG. 1, displaying an anagram-type puzzle. In this preferred embodiment, there are a total of thirty seven scrambled characters contained in seven anagrams 12, 14, 16, 18, 20, 22, and 24 on the left side of the gameboard 10. It should be evident that both the number of characters per anagram and the number of anagrams will vary from puzzle to puzzle. Each of said anagrams 12, 14, 16, 18, 20, 22, and 24 is next to a corresponding horizontally aligned set of designated spaces 112, 114, 116, 118, 120, 122, and 124. In the sample puzzle shown, each of the characters is a letter, however it should be evident that any alphanumeric character or other symbol or character may be used. In the sample puzzle shown, each of the spaces (34 through 106) is designated by a square, however it should be evident that any designation such as a circle, underline, or any other geometric shape may be substituted in its stead. It should further be evident that any number of anagrams could be used, so long as the total number of characters corresponds to the total number of spaces (34 through 106), and the number of anagrams 12, 14, 16, 18, 20, 22, and 24 corresponds to the number of space sets 112, 114, 116, 118, 120, 122, and 124. Further, it is preferable that each of anagrams 12, 14, 16, 18, 20, 22, and 24 are adjacent and to the left of its corresponding space sets 112, 114, 116, 118, 120, 122, and 124, but other arrangements should be apparent. As shown, it is preferred that the designated spaces (34 through 106) within each space set 112, 114, 116, 118, 120, 122, and 124 be horizontally aligned, and that said space sets 112, 114, 116, 118, 120, 122, and 124 be vertically aligned relative each other, as will be discussed below, but other arrangements are possible to accomplish the purposes of this invention as will become evident.

The gameboard 10 is preferably displayed on a computer or video monitor for use as a computer game or for use by contestants of a game show. The movements of the displayed characters, as described hereinafter, can be accomplished by well known computer graphics, animation, or other software programs. Alternatively, the gameboard 10 can be displayed directly and the movements to be described hereinbelow can be accomplished by mechanical or manual means.

Play

A random number or dollar value within a predetermined range is displayed for less than a second in a random one of the squares (34 through 106). A second random number or dollar value is displayed immediately thereafter for less than a second in another random one of the squares (34 through 106). Further random numbers continue to be displayed in the same random squares in the same manner. These numbers are generated and displayed by well known means either electronically or by computer. It is preferred that these numbers not appear in highlighted squares 40, 44, 58, 72, 76, 86, 96.

Each player has a plunger or other type of signalling device which is connected to the means for generating and displaying the numbers. A player's turn begins when he or she strikes the plunger stopping the further generation of numbers and displaying the last random number generated.

Figure 3:
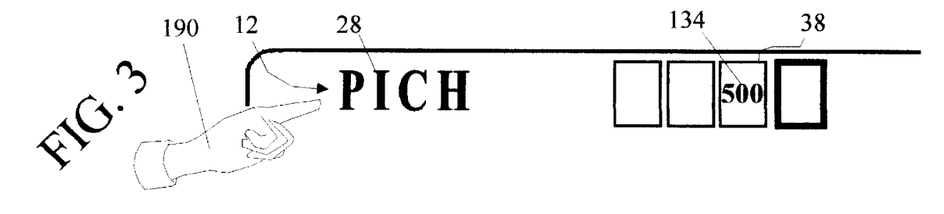
FIGS. 3–5 are enlarged front views of a portion of the gameboard depicted in FIG. 1 displaying the same puzzle depicted in FIG. 1 at respective later points in time relative to the first point in time depicted in FIG. 1.

FIG. 1 shows what a typical sample gameboard 10 displays before the game is begun. FIGS. 2 and 3 show what gameboard 10 might display in a typical sample game after the first player has hit his plunger. The randomly chosen number or dollar value 500 appears in a random square, in this example square 38.

Immediately after the player hits his plunger and 500 appears in square 38, the hostess directs everyones attention to anagram 12 in some manner as by pointing her finger 190 in that direction as shown in FIGS. 4–8. Alternatively, some indicator or other means are provided to direct attention to anagram 12.

The appearance of 500 in square 38 accomplishes two things. First, it is a notification that the player is now playing for five hundred dollars or points. Second, the player is given a hint in the way of a free letter which is to be moved into square 38.

Figure 4:
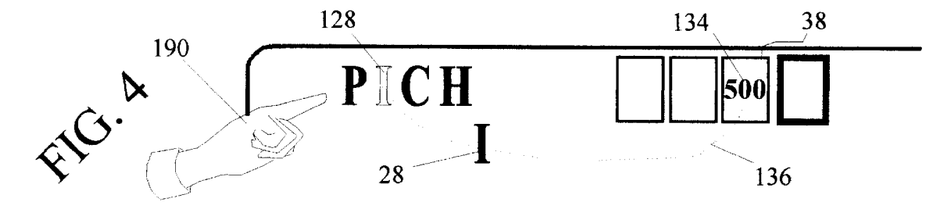
Figure 5:
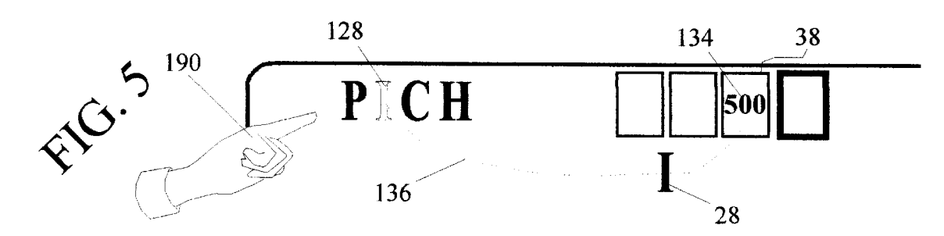
Figure 6:
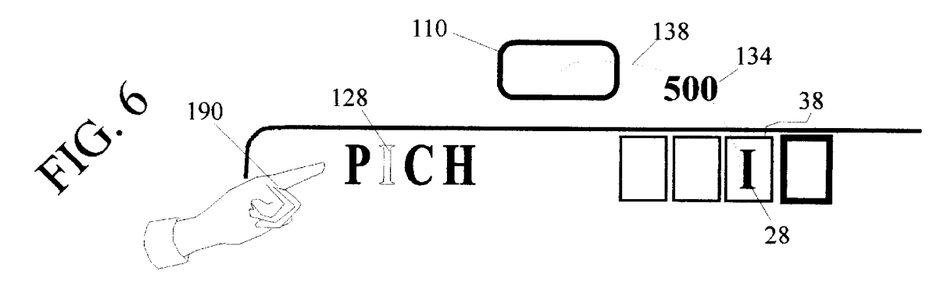
FIGS. 6 and 7 are enlarged front views of a portion of the gameboard depicted in FIG. 1 displaying the same puzzle depicted in FIG. 1 at respective points in time later than the points in time depicted in FIGS. 3–5.

It will be seen in FIG. 15, which reveals the final solution to the sample puzzle, that the letter I 28 is the letter to be correctly placed in square 38. Therefor, as shown in FIGS. 3–6, the letter I 28 is moved along a path 136 from its initial position as shown in FIG. 3 to its final unscrambled position in square 38 as shown in FIG. 6. If movement of letters on the gameboard 10 is controlled by a computer, the computer can be programmed in a variety of well known ways to provide for the movement of letter I 28 as shown. Alternatively, the letter I 28 can be moved mechanically or manually by the hostess. The shape of path 136 is not important. What is important is that the movement of the letter I 28 along path 136 allows all viewers to follow the progress of the letter I 28 to its unscrambled final position. If, for instance, the letter I 28 were to disappear from its initial position and reappear in its final position without travelling along a path, the viewer will have a much more difficult time following the progress of the puzzle. This is another reason why it is preferable for the hostess to constantly direct the attention of the viewer to the portion of the puzzle which is about to be moved.

FIG. 3 shows the letter I 28 in its initial position; FIG. 4 shows the letter I 28 in an intermediate position along path 136; FIG. 5 shows the letter I 28 in a second intermediate position further along path 136; and FIG. 6 shows the letter I 28 in its final position. If the letter I 28 is moved manually by the hostess, then the letter I 28 will pass each of the infinite number of points along said path 136, and the viewer will easily be able to follow its movement. If displayed on a video or computer monitor, the movement of letter I 28 will result in its position at a number of points along the path 136 consistent with the number of frames used during its movement sequence. The more frames the better.

When the letter I 28 is moved from its initial scrambled position, as shown in FIG. 4, an outline 128 of the letter I is left with the remaining scrambled letters P 26, C 30, and H 32 in anagram 12. This outline 128 assists the viewer in studying and concentrating on anagram 12 without having to move the focus of his eye from the left side of the puzzle to the right side of the puzzle. In a previous videotaped game show version of REVELATION®, no outline similar to outline 128 was provided for any of the letters. Without this outline, the focus of the viewer's eye was required shift constantly back and forth to remember and evaluate all of the letters contained in the anagram. Because this was relatively difficult, it detracted from the enjoyment of the game. With outlines such as outline 128 for all of the letters, the viewer is allowed to keep his focus on only one area of the puzzle at a time, and is able to concentrate on the real object of the game, solving the anagram. This makes it easier for the viewer and players to play and follow the game and therefor necessarily adds considerable enjoyment.

Figure 7:
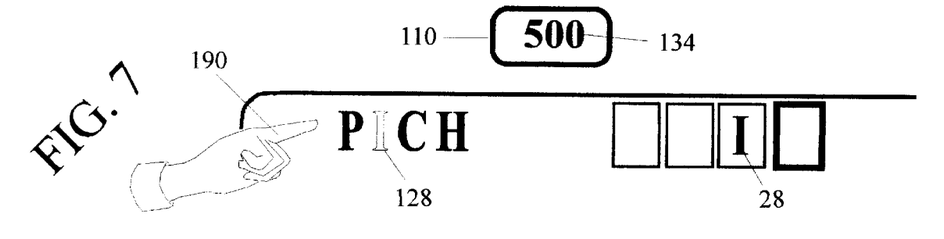
Figure 8:
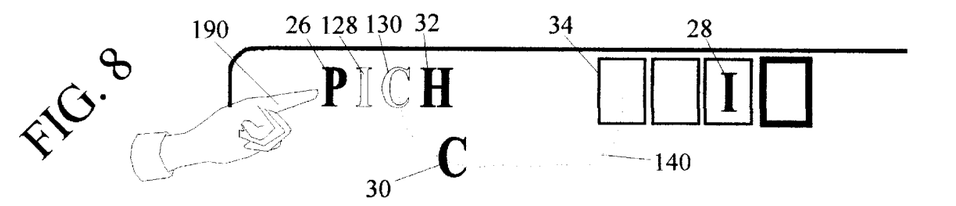
FIGS. 8–13 are enlarged front views of a portion of the gameboard depicted in FIG. 1 displaying the same puzzle depicted in FIG. 1 at respective points in time later than the points in time depicted in FIGS. 6 and 7.
Figure 9:
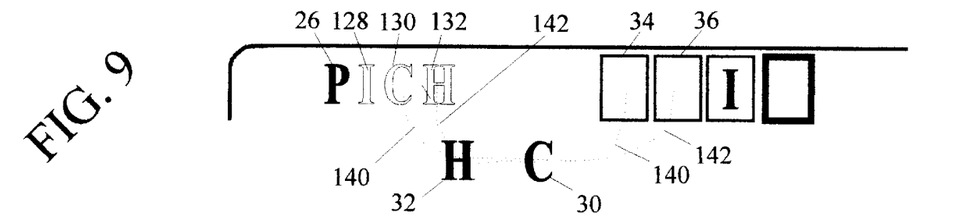
Figure 10:
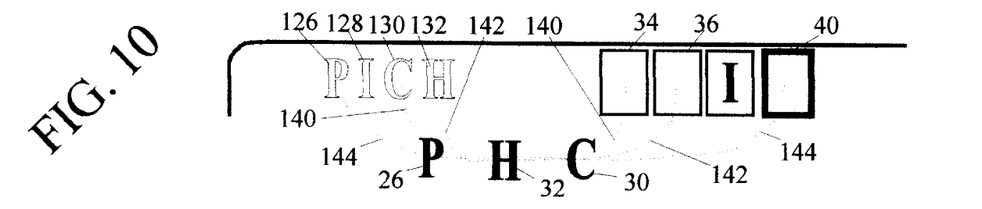
Figure 11:
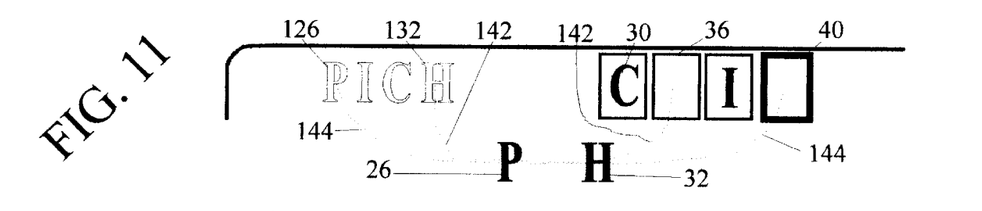
Figure 12:
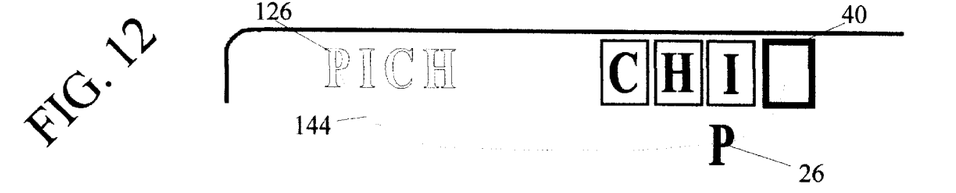
Figure 13:
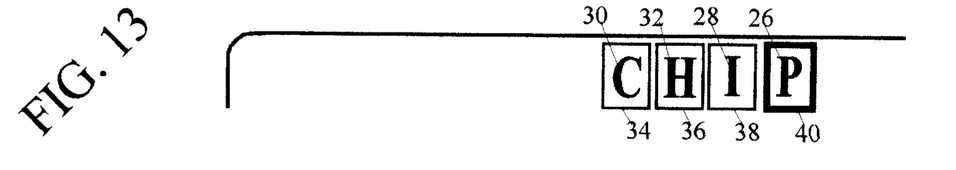

As shown in FIGS. 5–7, once the letter I 28 reaches its destination, the point value 500 is moved along path 138 to bank 110. Once again, the shape of path 138 in not important. But it is preferable that the viewer be able to follow the movement of point value 500 along as many points along the path 138 as possible. Also, once again, movement of point value 500 can be accomplished mechanically, manually, or preferably by computer programming and the resulting display on a computer or video monitor.

When the letter I 28 reaches its destination and/or the point value 500 reaches bank 110, the player is given a predetermined amount of time to make a guess at solving the anagram 12. The anagram 12 consists of the letters P 26, I 28, C 30, and H 32, and the hint reveals that the third letter is I.

As shown in FIG. 15, anagram 12 is correctly unscrambled to the word CHIP. Therefor, if the player correctly guesses the word CHIP, the letters C 30, H 32, and P 26 will be moved from their respective initial positions shown in FIGS. 1–7 to their respective final unscrambled positions shown in FIGS. 13–15. FIGS. 7–13 shows the movement of letters C 30, H 32, and P 26 along their respective paths 140, 142, and 144 to their respective final positions in squares 34, 36, and 40. Letters 30, 32, and 26 don't just disappear from their initial position and reappear in their final position. Once again, viewers are able to follow the progress of the letters because they move along a path. The shape of the path is not important. But it is preferrable that at least a portion of paths 140, 142, and 144 overlap so that, once again, it is easy for the viewer to follow the unscrambling of the anagram. It should be evident that if the letters 140, 142, and 144 are moved along a similar path, the viewers eye will not have to shift and refocus as the letters 140, 142, and 144 are moved in immediate succession to their unscrambled final positions in squares 34, 36, and 40.

In a previous videotaped game show version of REVELATION®, and in another prior art anagram-type game show, when a player correctly guessed an anagram, the letters that were still in their initial scrambled position simply disappeared from their initial position and reappeared in their final position without moving along a path. Without movement of the letters along a path, the focus of the viewer's eye was required to be moved constantly back and forth to remember where all of the letters came from and ascertain where they went to. Because this was relatively difficult, it detracted from the enjoyment of the game, By moving the letters along a path, and preferrably along a similar path, the viewer is allowed to keep his focus on only one area of the puzzle at a time, and is able to concentrate on the real object of the game, solving the anagram. This makes it easier for the viewer and players to play and follow the game and therefor necessarily adds considerable enjoyment.

Figure 14:
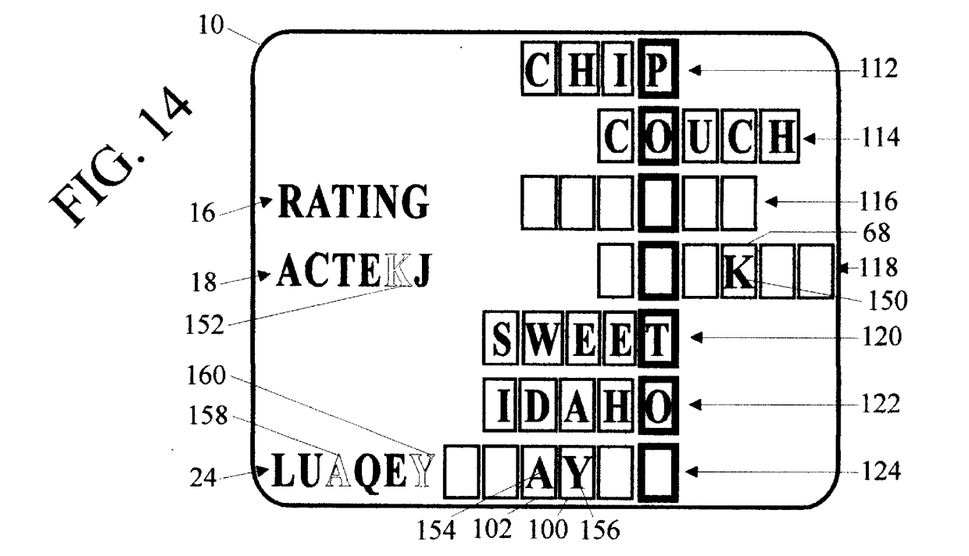
FIG. 14 is front view of a gameboard displaying the same puzzle depicted in FIG. 1 at a point in time which is later than the points in time depicted in FIGS. 8–13.

FIG. 14 shows what game board 10 looks like at some point near the middle of the game. At this point in the game, the players have guessed four anagrams CHIP, COUCH, SWEET, and IDAHO which letters have been moved into their final positions in the squares of respective horizontally aligned square sets 112, 114, 120, and 122. No hints have been given for anagram 16. At some point during the game, the players have been given a hint for solving anagram 18 by the movement of the letter K 150 into square 68. Note that, for ease of study and visual display, the outline or shadow 152 of the letter K 150 remains in its initial position in anagram 18. And the players have been given a two hints for solving anagram 24 by the movements of the letters A 154 and Y 156 into their respective final positions in squares 100 and 102. And the outlines 158 and 160 remain in their initial positions in anagram 24 to allow the players and other viewers to study the anagram without having to shift their focus from the anagram 24 to the letters A 154 and Y 156 which are some distance to the right.

FIG. 15 shows the gameboard 10 at the end of the game after the players have guessed all of the anagram clues and the final solution to the sample puzzle. Note that the letters which spell the final solution POTATOE 170 are revealed in highlighted vertically aligned squares 40, 44, 58, 72, 76, 86, 96.

The invention is not limited to the embodiments described above. All changes and modifications thereof, not constituting departures from the spirit and scope of the invention, are intended to be included.

I claim:

1. Apparatus for playing an anagram-type game comprising:

a gameboard;

one or more anagrams; each anagram defined by a plurality of moveable characters; each anagram having a solution defined by a predetermined correct arrangement of the characters defining said anagram; each anagram having a plurality of unsolved arrangements defined by any arrangement of the characters defining said anagram which is different from said solution; each anagram being displayed in one of its unsolved arrangements in a predetermined area on said gameboard, said predetermined area defining an unsolved area of said anagram, each of the respective characters defining said anagram having an initial position within said unsolved area;

each anagram having a solution area on said gameboard in which the solution to said anagram is to be eventually displayed, each of the respective characters defining said anagram having a predetermined visually designated final position within said solution area;

each of said characters having a path defined by a predetermined plurality of points from said character's initial position to said character's final position;

character moving means for moving each of said characters along its respective path from its respective initial position to its respective final position in response to selection of said character.

2. The apparatus of claim 1 wherein a portion of the paths of each character defining the same anagram are substantially identical whereby it is easy to visually follow the movement of a plurality of characters in the same anagram when they are all moved by said moving means in immediate succession.

3. The apparatus of claim 1 wherein each plurality of final positions within a respective one of said solution areas includes one designated final position that is visually distinct from all other designated final positions in said respective solution area.

4. The apparatus of claim 3 wherein said visually distinct final positions are aligned in a first direction.

5. The apparatus of claim 4 wherein said solution areas are aligned in a second direction substantially perpendicular to said first direction.

6. The apparatus of claim 1 wherein said designated final positions are substantially square shaped.

7. The apparatus of claim 3 wherein the characters moved into said visually distinct final positions define an ultimate solution.

8. Apparatus for playing an anagram-type game comprising:

a gameboard;

one or more anagrams; each anagram defined by a plurality of moveable characters; each anagram having a solution defined by a predetermined correct arrangement of the characters defining said anagram; each anagram having a plurality of unsolved arrangements defined by any arrangement of the characters defining said anagram which is different from said solution; each anagram being displayed in one of its unsolved arrangements in a predetermined area on said gameboard, said predetermined area defining an unsolved area of said anagram, each of the respective characters defining said anagram having an initial position within said unsolved area;

each anagram having a solution area on said gameboard in which the solution to said anagram is to be eventually displayed, each of the respective characters defining said anagram having a predetermined visually designated final position within said solution area;

character moving means for moving each of said characters from its respective initial position to its respective final position outline means for displaying on outline of each of said characters in its initial position after said character is moved from its initial position, whereby said outline can be viewed together with adjacent characters or outlines in said unsolved area.

9. The apparatus of claim 8 wherein said designated final positions are substantially square shaped.

10. The apparatus of claim 8 wherein each plurality of final positions within a respective one of said solution areas includes one designated final position that is visually distinct from all other designated final positions in said respective solution area, and wherein said visually distinct final positions are aligned, and wherein the characters moved into said visually distinct final positions define an ultimate solution.

11. Apparatus for playing an anagram-type game comprising:
   a gameboard;
   one or more anagrams; each anagram defined by a plurality of moveable characters; each anagram having a solution defined by a predetermined correct arrangement of the characters defining said anagram; each anagram having a plurality of unsolved arrangements defined by any arrangement of the characters defining said anagram which is different from said solution; each anagram being displayed in one of its unsolved arrangements in a predetermined area on said gameboard, said predetermined area defining an unsolved area of said anagram, each of the respective characters defining said anagram having an initial position within said unsolved area;
   each anagram having a solution area on said gameboard in which the solution to said anagram is to be eventually displayed, each of the respective characters defining said anagram having a predetermined visually designated final position within said solution area;
   character moving means for moving each of said characters from its respective initial position to its respective final position;
   indicator means for directing the attention of players of said game to a selected one of said unsolved areas before a player guesses the solution of the anagram in said unsolved area.

12. The apparatus of claim 11 wherein said indicator means is a person.

13. The apparatus of claim 11 wherein said indicator means is an animated character.

14. Apparatus for playing an anagram-type game comprising:
   a gameboard;
   one or more anagrams; each anagram defined by a plurality of moveable characters; each anagram having a solution defined by a predetermined correct arrangement of the characters defining said anagram; each anagram having a plurality of unsolved arrangements defined by any arrangement of the characters defining said anagram which is different from said solution; each anagram being displayed in one of its unsolved arrangements in a predetermined area on said gameboard, said predetermined area defining an unsolved area of said anagram, each of the respective characters defining said anagram having an initial position within said unsolved area;
   each anagram having a solution area on said gameboard in which the solution to said anagram is to be eventually displayed, each of the respective characters defining said anagram having a predetermined visually designated final position within said solution area;
   character moving means for moving each of said characters from its respective initial position to its respective final position;
   random selection means for randomly selecting one of said final positions into which a predetermined one of said characters is to be moved by said character moving means.

15. Method for playing an anagram-type game comprising:
   displaying one or more anagrams on a gameboard; each anagram defined by a plurality of moveable characters; each anagram having a solution defined by a predetermined correct arrangement of the characters defining said anagram; each anagram having a plurality of unsolved arrangements defined by any arrangement of the characters defining said anagram which is different from said solution; each anagram being initially displayed in one of its unsolved arrangements in a predetermined area on said gameboard, said predetermined area defining an unsolved area of said anagram, each of the respective characters defining said anagram having an initial position within said unsolved area;
   displaying a solution area on said gameboard for each displayed anagram, each solution area defining an area on said gameboard in which the solution to said anagram is to be eventually displayed, each of the respective characters defining said anagram having a predetermined visually designated final position within said solution area;
   randomly selecting one of said anagrams and providing a player with a predetermined amount of time to guess the solution to said selected anagram;
   moving the characters of said selected anagram which are still in their initial positions from said initial positions to their respective final positions in response to the solution of said anagram being guessed by said player.

16. The method of claim 15 wherein the step of randomly selecting one of said anagrams includes randomly selecting one of said final positions and moving a predetermined one of said characters into said final position, whereby the anagram which is partially defined by said character is said randomly selected anagram.

17. The method of claim 16 wherein the step of randomly selecting one of said final positions includes generating a plurality of numbers one at a time in said final positions and stopping said generation of numbers randomly, whereby a single number is displayed in a single one of said final positions defining said selected final position.

18. The method of claim 15 further comprising the step of randomly generating and displaying at least one number in a random one of said final positions in response to signalling input from one of said players wherein said displayed number represents a value to be awarded said player upon correctly guessing the unscramble pattern of one of said anagrams.

19. The method of claim 15 further comprising the steps of:
   each of said characters having a path defined by a plurality of points from said character's initial position to said character's respective predetermined final position;
   rapidly moving said characters along their respective paths from said characters' initial positions to said characters' predetermined final positions in response to a player correctly guessing the solution of said selected anagram.

* * * * *